(12) United States Patent
Henderson et al.

(10) Patent No.: US 7,762,498 B1
(45) Date of Patent: Jul. 27, 2010

(54) ENHANCED HIGH-EFFICIENCY SPACECRAFT PROPULSION SYSTEM

(75) Inventors: John B. Henderson, Perrineville, NJ (US); Neil E. Goodzeit, Princeton, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 910 days.

(21) Appl. No.: 11/246,277

(22) Filed: Oct. 11, 2005

Related U.S. Application Data

(60) Provisional application No. 60/688,732, filed on Jun. 9, 2005.

(51) Int. Cl.
*B64G 1/40* (2006.01)

(52) U.S. Cl. .................................. 244/171.1

(58) Field of Classification Search .......... 244/171.1, 244/171.3, 172.2, 172.3; 60/259
See application file for complete search history.

(56) References Cited

U.S. PATENT DOCUMENTS

| | | | | |
|---|---|---|---|---|
| 2,408,111 A | * | 9/1946 | Truax et al. | 60/260 |
| 3,224,189 A | * | 12/1965 | Kenny | 60/211 |
| 3,283,508 A | * | 11/1966 | Schulze | 60/223 |
| 3,286,954 A | * | 11/1966 | Swet | 244/171.7 |
| 3,570,249 A | * | 3/1971 | Baum et al. | 60/259 |
| 3,591,969 A | * | 7/1971 | Brereton et al. | 60/259 |
| 3,910,037 A | * | 10/1975 | Salkeld | 60/250 |
| 3,917,014 A | * | 11/1975 | Ward | 180/6.48 |
| 4,382,748 A | * | 5/1983 | Vanderlaan | 417/11 |
| 4,589,253 A | * | 5/1986 | Wagner | 60/204 |
| 4,609,169 A | * | 9/1986 | Schweickert et al. | 244/169 |
| 4,880,185 A | * | 11/1989 | Apfel | 244/135 B |
| 4,912,925 A | * | 4/1990 | Foust | 60/259 |
| 4,923,152 A | * | 5/1990 | Barkats | 244/171.1 |
| 5,063,734 A | * | 11/1991 | Morris | 60/204 |
| 5,141,181 A | * | 8/1992 | Leonard | 244/172.2 |
| 5,203,844 A | * | 4/1993 | Leonard | 244/171.3 |
| 5,220,320 A | * | 6/1993 | Assal et al. | 340/2.21 |
| 5,251,852 A | * | 10/1993 | Pulkowski et al. | 244/135 C |
| 5,263,666 A | * | 11/1993 | Hubert et al. | 244/171.3 |
| 5,481,869 A | * | 1/1996 | Pahl | 60/259 |
| 5,533,331 A | * | 7/1996 | Campbell et al. | 60/204 |
| 5,636,513 A | * | 6/1997 | Pahl | 60/204 |
| 5,651,515 A | * | 7/1997 | Saccoccia et al. | 244/158.5 |
| 5,880,356 A | * | 3/1999 | Delepierre-Massue et al. | 73/37 |
| 6,113,032 A | * | 9/2000 | Cochran et al. | 244/135 R |

(Continued)

FOREIGN PATENT DOCUMENTS

DE 19504098 A1 * 8/1996

*Primary Examiner*—Tien Dinh
*Assistant Examiner*—Joseph W Sanderson
(74) *Attorney, Agent, or Firm*—McDermott Will & Emery LLP

(57) ABSTRACT

A high-efficiency spacecraft propulsion system, including includes electric pumps inserted in the oxidizer and fuel lines that increase liquid apogee engine ("LAE") operating pressure and reduce tank-operating pressure. An on-board computer generates pump drive signals, in response to measured oxidizer and fuel line pressures, that are input to the pump controller electronics. The controller electronics provides current drives to the pump motors. The system uses an LAE that can operate at higher thrust chamber pressures (e.g., 500 psia) than standard LAEs, where pump-fed rocket motors have integrated turbopumps that are fuel operated. The turbopump increases LAE complexity and cost, reduces fuel efficiency, and is not compatible with active thrust and mixture ratio control.

26 Claims, 4 Drawing Sheets

U.S. PATENT DOCUMENTS

| | | | |
|---|---|---|---|
| 6,227,842 B1 * | 5/2001 | Lemelson et al. | 431/12 |
| 6,264,145 B1 * | 7/2001 | Maute | 244/171.1 |
| 6,314,718 B1 * | 11/2001 | Schneider | 60/218 |
| 6,360,993 B1 * | 3/2002 | Turner | 244/171.3 |
| 6,408,613 B1 * | 6/2002 | Shaw | 60/39.6 |
| 6,468,069 B2 * | 10/2002 | Lemelson et al. | 431/12 |
| 6,637,701 B1 * | 10/2003 | Glogowski et al. | 244/169 |
| 6,726,154 B2 * | 4/2004 | Casillas et al. | 244/171.1 |
| 6,776,372 B2 * | 8/2004 | Salvatore et al. | 244/135 C |
| 6,808,145 B2 * | 10/2004 | Burton | 244/171.1 |
| 6,845,950 B1 | 1/2005 | Goodzeit et al. | |
| 6,908,064 B2 * | 6/2005 | Goodzeit et al. | 244/169 |
| 6,912,996 B2 * | 7/2005 | Kato | 123/469 |
| 7,047,722 B2 * | 5/2006 | Filippone | 60/39.182 |
| 7,194,853 B1 * | 3/2007 | Knight | 60/259 |
| 2002/0139902 A1 * | 10/2002 | Valentian | 244/172 |
| 2002/0175247 A1 * | 11/2002 | Zeender et al. | 244/172 |

* cited by examiner

ENHANCED HIGH-EFFICIENCY SPACECRAFT PROPULSION SYSTEM

CROSS-REFERENCE TO RELATED APPLICATIONS

This application claims the benefit of U.S. Provisional Application No. 60/688,732, entitled "High-Efficiency Spacecraft Propulsion System," filed Jun. 9, 2005, which is hereby incorporated by reference.

STATEMENT AS TO RIGHTS TO INVENTIONS MADE UNDER FEDERALLY SPONSORED RESEARCH OR DEVELOPMENT

Not Applicable.

BACKGROUND OF THE INVENTION

1. Field of the Invention

The present invention generally relates to spacecraft and, in particular, relates to improved performance, high-efficiency spacecraft propulsion.

2. Description of the Related Art

For Global Positioning System ("GPS") III missions, it is desirable to dual-launch spacecraft into a low Earth orbit ("LEO") storage orbit and then transfer the spacecraft to a medium Earth orbit ("MEO") at a later time. This approach would enable dual-launched spacecraft to be delivered to separate orbit planes, thereby reducing launch costs by 30% or more, and potentially saving hundreds of millions of dollars for a constellation of twenty-four spacecraft.

Unfortunately, and as shown below in Tables 1 and 5, this mission is not presently viable using conventional orbit transfer systems. Specifically, because of the low specific impulse (Isp) of the Liquid Apogee Engine ("LAE") and high propulsion system dry mass, a negative mass margin of approximately 225 kg occurs for a spacecraft with a dry mass of 2249 kg. Known approaches to increase orbit transfer efficiency, such as partial orbit transfers with Hall Current Thrusters ("HCTs"), cannot be used, because the spacecraft would spend too much time in the proton belts, possibly damaging its solar array and electronics.

TABLE 1

Mission Results for Conventional Systems

| Quantity | Conventional Propulsion System |
| --- | --- |
| Spacecraft dry mass (kg) | 2249 |
| Max. dry mass to orbit (kg) | 2024 |
| Spacecraft mass margin (kg) | −225 |
| Mission viability | No |
| Fuel mass (kg) | 2083 |
| Oxidizer mass (kg) | 1982 |
| SC wet mass (kg) | 6099 |
| LAE specific impulse (sec) | 329 |
| LAE mixture ratio | 1 |
| LAE thrust (lbf) | 170 |
| Orbit transfer efficiency | 98% |
| LEO storage orbit | Alt 1,408 km circ., 39 deg inc. |
| MEO mission orbit | Alt 20,182 km, 55 deg inc. |
| Launch vehicle | Atlas V551 |
| Dual launch payload system weight ("PSW") (kg) | 13,150 |

One approach is to use a conventional pump-fed rocket engine in order to get higher inlet pressures and a higher Isp. Since conventional pump-fed rocket engines use turbopumps that operate off of decomposed fuel, such as hydrazine gas, fuel efficiency is reduced since some of the fuel is consumed by the pumps. Furthermore, since the pump is an integral part of the LAE, new pump designs must be developed if the LAE is changed, increasing complexity and cost.

Accordingly, it is desirable to provide for spacecraft propulsion systems which overcome these conventional deficiencies. In particular, it is desirable to provide for an enhanced performance, high-efficiency spacecraft propulsion system which increases the spacecraft orbit transfer performance with modifications that increase LAE efficiency and reduce propulsion system mass.

SUMMARY OF THE INVENTION

The present invention generally relates to spacecraft and, in particular, relates to improved performance, high-efficiency spacecraft propulsion.

The present invention generally relates to a propulsion system which enables a mission that dual-launches spacecraft to separate planes, by providing at least a positive 90 kg mass margin for a reference mission, and improving performance for future commercial and government missions, such as the extended range LOCKHEED MARTIN® A2100 satellite, and the Transformational Satellite Communications System ("TSAT") missions. For extended range A2100-series spacecraft, Ariane V launch mass-to-orbit performance is increased by 268 kg, and Atlas V431 mass-to-orbit performance is increased by 145 kg. Furthermore, weight-savings benefits are increased by approximately 60 kg for GPS III missions, due to reduced propulsion system mass.

In more detail, the present invention includes electric pumps inserted in the oxidizer and fuel lines that increase LAE operating pressure and reduce tank-operating pressure. In response to measured oxidizer and fuel line pressures, an on-board computer ("OBC") generates pump drive signals that are input to the pump controller electronics. The controller electronics provides current drives to the pump motors. The system uses an LAE that operates at higher thrust chamber pressures than standard LAEs, providing a higher specific impulse.

According to one arrangement, the present invention is a propulsion system including an LAE which further includes a plurality of inlets. The propulsion system also includes a plurality of propellant tanks each in fluid communication with the plurality of inlets via a propellant line, and a plurality of low-mass electric pumps. Each of the plurality of low-mass electric pumps is inserted in one of the propellant lines, where the plurality of low-mass electric pumps provide LAE inlet pressure between 500 pounds-force per square inch absolute (psia) and 1000 pounds-force per square inch absolute.

To its advantage, the present invention provides hermetically sealed pumps for both oxidizer and fuel, improving seal material and geometry selection and eliminating material incompatibilities with oxidizers which limit seal effectiveness of conventional turbopumps at high pressure differences. The present invention also provides separate hermetically sealed pumps for the oxidizer and fuel, instead of the conventional design which uses single shaft pumps for both propellants and requires helium purges in order to keep the propellants separated. As such, the present invention exhibits little or no soakback from the LAE to the separate pumps, and has fewer restrictions as to system geometry, mass, and complexity. Furthermore, since the present invention uses batteries to drive the pumps instead of using propellant, effective specific impulse is increased over conventional designs which use propellants. Finally, during check-out AI&T, the pumps used by the present invention can be operated as required for validation, which is a significant improvement over conventional systems in which the ability to test performance at the system level or higher is severely limited.

The propulsion system further includes a pump controller, the pump controller modulating current drive inputs to the plurality of low-mass electric pumps based upon command inputs, and an OBC, the OBC calculating the command inputs based upon LAE inlet pressure, and transmitting the command inputs to the pump controller. The command inputs from the OBC may be pressure commands.

The pump controller further includes two separate controller units, where each of the two separate controller units includes 2-for-1 redundant electronics, or the pump controller includes 3-for-2 redundant electronics. The OBC and/or the pump controller may implement proportional-integral ("PI") controllers or higher-order controllers in order to control the LAE inlet pressure.

The plurality of propellant tanks includes at least a first fuel tank and/or at least a first oxidizer tank. The propellant lines each include a pressure relief valve, the pressure relief valves allowing for backflow of propellant if a pressure threshold is exceeded. The plurality of propellant tanks are cylindrical and further include spherical end caps.

The plurality of propellant tanks includes at least a first fuel tank, and at least first and second oxidizer tanks, where the first fuel tank is disposed between the first and second oxidizer tanks. Alternatively, the plurality of propellant tanks includes at least a first oxidizer tank, and at least first and second fuel tanks, where the first oxidizer tank is disposed between the first and second fuel tanks.

The plurality of low-mass electric pumps enable the LAE to provide a specific impulse of at least 350 seconds, and/or support mass flow rates of up to two pounds of mass per second. The thrust level of the LAE is between 400 pounds force and 600 pounds force. The plurality of low-mass electric pumps have a power range between 3 kW and 6 kW.

The propulsion system further includes a plurality of thrusters, where the plurality of thrusters are hydrazine reaction engine assemblies and/or arcjets. The plurality of thrusters operate at an inlet pressure between 50 pounds per square inch absolute and 150 pounds per square inch absolute.

At least one of the plurality of propellant tanks stores dinitrogen tetroxide ($N_2O_4$) and/or hydrazine ($N_2H_4$).

According to a second arrangement, the present invention is a spacecraft including a propulsion system, the propulsion system including an LAE which further includes a plurality of inlets. The propulsion system also includes a plurality of propellant tanks each in fluid communication with the plurality of inlets via a propellant line, and a plurality of low-mass electric pumps. Each of the plurality of low-mass electric pumps is inserted in one of the propellant lines, where the plurality of low-mass electric pumps provide LAE inlet pressure between 500 pounds-force per square inch absolute and 1000 pounds-force per square inch absolute.

The spacecraft further includes a solar array, where the solar array is used to re-charge a battery to drive the plurality of low-mass electric pumps.

In the following description of the preferred embodiment, reference is made to the accompanying attachments that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings, in which like reference numbers represent corresponding parts throughout.

DETAILED DESCRIPTION OF THE INVENTION

Figure 1:
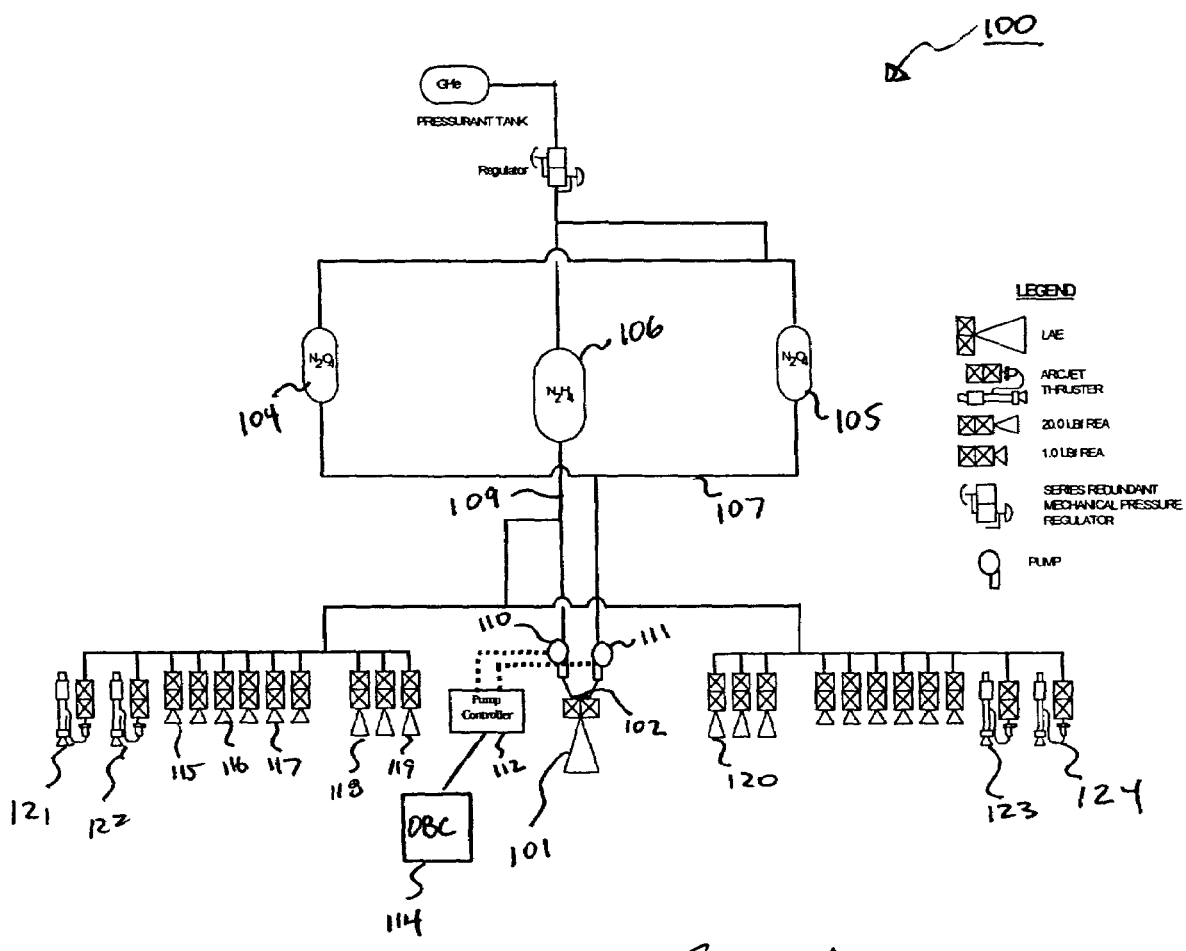
FIG. 1 depicts a propulsion system according to one embodiment of the present invention.

FIG. 1 depicts a propulsion system according to one embodiment of the present invention. Briefly, according to the FIG. 1 embodiment, the propulsion system includes an LAE which further includes a plurality of inlets. The propulsion system also includes a plurality of propellant tanks each in fluid communication with the plurality of inlets via a propellant line, and a plurality of low-mass electric pumps. Each of the plurality of low-mass electric pumps is inserted in one of the propellant lines, where the plurality of low-mass electric pumps provide LAE inlet pressure between 500 pounds-force per square inch absolute (psia) and 1000 psia.

The system according to the present invention separates the pump function from the LAE, simplifying the LAE design. Since the pump is separate, new pump development is not required if the LAE model is changed, and the pump technology may be upgraded independently without impacting the LAE design. An on-board computer controls the oxidizer and fuel pump output pressures to between 500 psia and 1000 psia, allowing active control of mixture ratio and thrust, and consequently improving fuel efficiency. As such, the use of low-mass electric pumps, rather than conventional turbopumps, maximizes fuel efficiency. Table 2, below, provides representative LAE and pump parameters for the propulsion system according to one example of the present invention.

TABLE 2

Representative LAE and Pump Parameters

| Quantity | Value |
| --- | --- |
| Thrust (lbf) | 500 |
| Specific Impulse (sec) | 350 |
| Area ratio | 350 |
| Mixture ratio | 1 |
| Chamber pressure (psia) | 500 |
| Oxidizer inlet pressure (psia) | 830 |
| Fuel inlet pressure (psia) | 670 |
| Propellant flow rate (lbm/sec) | 1.4 |
| Pump efficiency | 80% |
| Motor efficiency | 90% |
| Total power (kW) | 3.86 |

According to one arrangement, propulsion system 100 includes LAE 101, which further includes inlet 102. Propulsion system 100 also includes plurality of propellant tanks, including oxidizer tanks 104 and 105 and fuel tank 106, each of the plurality of propellant tanks in fluid communication with plurality of inlets 102 via a propellant line, such as oxidizer line 107 and fuel line 109, and a plurality of low-mass electric pumps, such as low-mass electric pumps 110 and 111. Each of the plurality of low-mass electric pumps is inserted in one of the propellant lines, where the plurality of low-mass electric pumps provide LAE inlet pressure between 500 pounds-force per square inch absolute and 1000 pounds-force per square inch absolute. The tanks are operated at 50 psia to 150 psia instead of the conventional 200 psia to 250 psia, making lighter tank designs are possible, and using less pressurant, thereby saving mass.

The FIG. 1 propulsion system enables a mission that dual-launches spacecraft to separate planes, by providing at least a positive 90 kg mass margin, and improving performance for future commercial and government missions, such as the extended range LOCKHEED MARTIN® A2100 satellite, and the TSAT missions. For extended range A2100-series spacecraft, Ariane V launch mass-to-orbit performance is increased by 268 kg, and Atlas V431 mass-to-orbit performance is increased by 145 kg. Furthermore, weight-savings benefits are increased by approximately 60 kg for GPS III missions, due to reduced propulsion system mass.

In propulsion system 100, the plurality of low-mass electric pumps are separate from LAE 101, and may be upgraded as pump technology improves without impacting the LAE design. Using the conventional turbopump approach, real-time control of LAE thrust and mixture ratio, the ratio of oxidizer to hydrazine, is not possible. Propulsion system 100, however, allows for throttling of LAE 101 during startup and controlling the mixture ratio during maneuvering, increasing system efficiency and mass-to-orbit performance.

Propulsion system 100 further includes pump controller 112, pump controller 112 modulating current drive inputs to the plurality of low-mass electric pumps based upon command inputs, from OBC 114. OBC 114 calculates the command inputs based upon LAE inlet pressure and transmits the command inputs to pump controller 112.

The plurality of electric pumps run off the spacecraft battery (not shown), which is sized for the communications mission, and is often underutilized during orbit transfer. Furthermore, an adequate solar array capability exists to recharge the battery between orbit transfer maneuvers.

Propulsion system 100 further includes a plurality of thrusters, where the plurality of thrusters are hydrazine reaction engine assemblies ("REAs"), such as REAs 115 to 120 and/or arcjets, such as arcjets 121 to 124. The plurality of thrusters operate at an inlet pressure between 50 pounds per square inch absolute and 150 pounds per square inch absolute. The plurality of propellant tanks, REAs, and arcjets are operated at a pressure of 50 to 150 psia, thereby allowing the plurality of propellant tanks to be lightened, for example, by reducing the mass of a 2100 kg capacity fuel tank by 28 kg. Furthermore, the mass of two oxidizer tanks with a total capacity of 2000 kg can be reduced by 24 kilograms. By operating the tanks at reduced pressure, the helium pressurant needed and the number of pressurant tanks are reduced, saving an additional 25 kilograms.

Pump controller 112 includes 3-for-2 redundant electronics. In an alternate, non-depicted aspect, pump controller 112 includes two separate controller units, where each of the two separate controller units includes 2-for-1 redundant electronics. Pump controller 112 and/or OBC 114 may implement proportional-integral controllers or higher-order controllers in order to control the LAE inlet pressure. The pumps include redundant motor windings and speed sensors, as required, to provide the necessary reliability.

The plurality of propellant tanks includes at least a first fuel tank, such as fuel tank 106 and/or at least a first oxidizer tank, such as oxidizer tank 104. The plurality of propellant tanks are cylindrical and further include spherical end caps (not depicted). As described more fully below with reference to FIG. 2, the propellant lines each include a pressure relief valve, the pressure relief valves allowing for backflow of propellant if a pressure threshold is exceeded.

In one alternative aspect, the plurality of propellant tanks includes at least a first fuel tank 106, and at least first oxidizer tank 104 and second oxidizer tank 105, where first fuel tank 106 is disposed between first oxidizer tank 104 and second oxidizer tank 105. In a similar, non-depicted aspect, the plurality of propellant tanks includes at least a first oxidizer tank, and at least first and second fuel tanks, where the first oxidizer tank is disposed between the first and second fuel tanks. As illustrated in FIG. 1, propulsion system 100 includes two oxidizer tanks (oxidizer tanks 104 and 105) and a single fuel tank (fuel tank 106). Each of the plurality of propulsion tanks are cylindrical with spherical end caps. Although FIG. 1 illustrates fuel tank 106 being mounted in the center of the structure with oxidizer tanks 104 and 105 mounted on the sides, in the alternative aspect this arrangement is reversed, with a single oxidizer tank in the center and two fuel tanks mounted on the outside.

Propulsion system 100 has the potential to increase spacecraft orbit transfer performance, since it includes features which increase LAE efficiency and reduce overall propulsion system mass. Propulsion system 100 is particularly well suited for the types of missions described above, and also future commercial and government geosynchronous orbit ("GEO") programs which require high payload mass.

The plurality of low-mass electric pumps enable the LAE to provide a specific impulse of at least 350 seconds, and/or support mass flow rates of up to two pounds of mass per second. The thrust level of the LAE is between 400 pounds force and 600 pounds force. The plurality of low-mass electric pumps have a power range between 3 kW and 6 kW.

The plurality of low-mass electric pumps which are inserted in the oxidizer and fuel lines increase LAE operating pressure and reduce tank-operating pressure. Propulsion system 100 system uses an LAE that operates at higher thrust chamber pressures than standard LAEs, providing a higher specific impulse.

At least one of the plurality of propellant tanks stores dinitrogen tetroxide ($N_2O_4$) and/or hydrazine ($N_2H_4$). Since the plurality of low-mass pumps are electrically-powered off of the spacecraft battery, they do not operate off of the decomposed fuel, such as hydrazine gas, unlike conventional pump-fed rocket engines which use turbopumps. The spacecraft batteries are sized for the normal communications mission, and hence excess battery capacity is available for operating pumps during orbit transfer. As such, overall fuel efficiency is improved over conventional designs.

To its advantage, the present invention provides hermetically sealed pumps for both oxidizer and fuel, improving seal material and geometry selection and eliminating material incompatibilities with oxidizers which limit seal effectiveness of conventional turbopumps at high pressure differences. The present invention also provides separate hermetically sealed pumps for the oxidizer and fuel, instead of the conventional design which uses single shaft pumps for both propellants and requires helium purges in order to keep the propellants separated. As such, the present invention exhibits little or no soakback from the LAE to the separate pumps, and has fewer restrictions as to system geometry, mass, and complexity. Furthermore, since the present invention uses batteries to drive the pumps instead of using propellant, effective specific impulse is increased over conventional designs which use propellants. Finally, during check-out AI&T, the pumps used by the present invention can be operated as required for validation, which is a significant improvement over conventional systems in which the ability to test performance at the system level or higher is severely limited.

Tables 3 and 4, below, compares a conventional propulsion system with the enhanced propulsion system described with relation to FIG. 1. As indicated in Table 2, propulsion system dry mass is reduced by as much as 65 kilograms and the LAE specific impulse is increased from 329 seconds to 350 seconds. The mass-to-orbit benefit for the GPS III Aurora mission is over 300 kg.

TABLE 3

Mission Results comparing conventional propulsion system with enhanced propulsion system

| Quantity | Conventional System | FIG. 1 Propulsion System |
| --- | --- | --- |
| Spacecraft dry mass (kg) | 2249 | 2184 |
| Max. dry mass to orbit (kg) | 2024 | 2275 |
| Spacecraft mass margin (kg) | −225 | 91 |
| Mission viability | No | Yes |
| Fuel mass (kg) | 2083 | 2083 |
| Oxidizer mass (kg) | 1982 | 1974 |
| Spacecraft wet mass (kg) | 6099 | 6336 |
| LAE specific impulse (sec) | 329 | 350 |
| LAE mixture ratio | 1 | 1 |
| LAE thrust (lbf) | 170 | 500 |
| Orbit transfer efficiency | 98% | 99% |
| LEO storage orbit | Alt 1,408 km circ., 39 deg inc. | Same |
| MEO mission orbit | Alt 20,182 km, 55 deg inc. | Same |
| Launch vehicle | Atlas V551 | Same |
| Dual launch PSW (kg) | 13,150 | 13,624 |

The present invention uses low-mass electric pumps inserted in the oxidizer and fuel lines to increase LAE operating pressure to increase specific impulse. The low-mass electric pumps allow the operating pressure of propulsion system 100 to be reduced, allowing the propellant tanks to be lightened, thereby reducing overall spacecraft mass. As indicated above in Table 3, the expected minimum specific impulse benefit is 21 seconds, increasing specific impulse from 329 seconds to 350 seconds. For the mission described in Table 3, the propulsion system dry mass is reduced by about 65 kilograms, where tank mass is reduced by 76 kilograms, and pump and control electronics mass is increased by 11 kilograms.

Propulsion system 100 is operated with an improved LAE that accommodates higher chamber pressures than conventional LAEs. OBC 114 controls the pumps to allow control over both LAE mixture ratio and thrust. Table 3 shows that, for one desired mission, propulsion system 100 results in a viable mission with 91 kg of dry mass margin.

Figure 2:
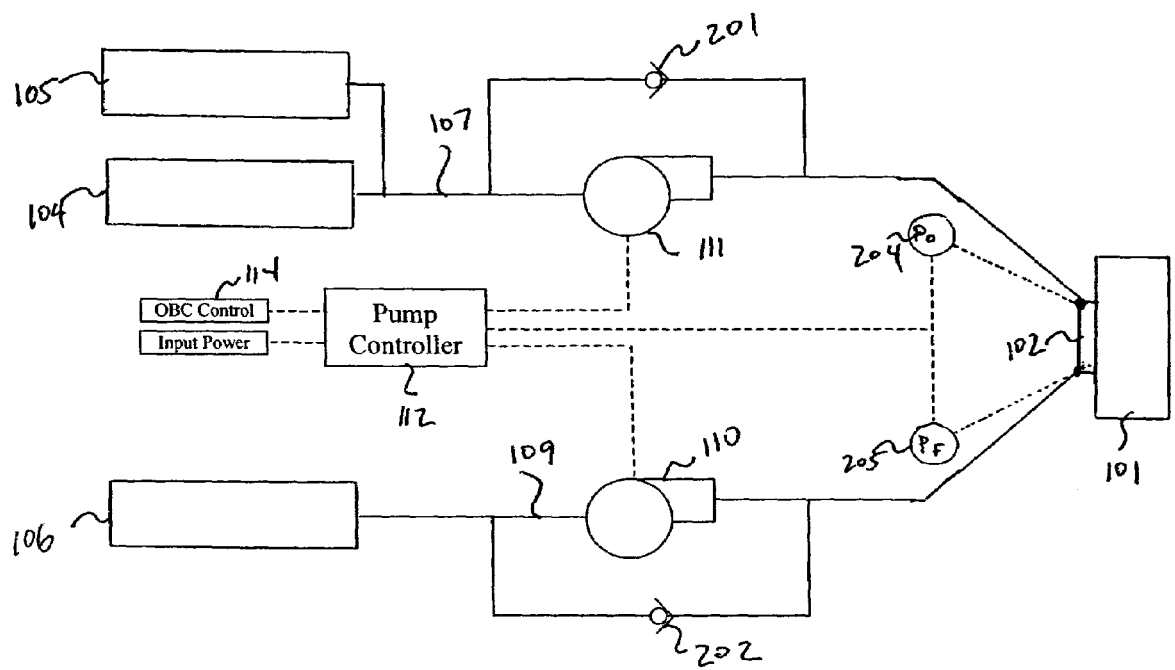
FIG. 2 illustrates a detailed pump configuration according to the FIG. 1 embodiment, depicting the pump controller software located within the OBC.

FIG. 2 illustrates the pump configuration, including the pump controller software located within the OBC. Propulsion system 100 improves upon conventional propulsion systems by inserting low-mass electric pumps 110 and 111 in both oxidizer line 107 and fuel line 109. Low-mass electric pumps 110 and 111 are located just above plurality of inlets 102 in LAE 101, however in alternate aspects the plurality of low-mass electric pumps are disposed at some other location in propulsion system 100 between LAE 101 and the plurality of propellant tanks.

The propellant lines, including oxidizer line 107 and fuel line 109 each include a pressure relief valve, such as pressure relief valves 201 and 202. Pressure relief valves 201 and 202 allow for backflow of the oxidizer and the fuel through oxidizer line 107 and fuel line 109, respectively. The pressure relief valves provide protection for propulsion system 100 by allowing for backflow of propellant, if the pump rated outlet pressure threshold is exceeded. The plurality of low-mass electric pumps are hermetically sealed with welded metal between the propellants and the electrical actuator/exterior of the device. The plurality of low-mass electric pumps operate with propellants and propellant simulator fluids, and are configured to operate with pressurant gases to validate spacecraft operation.

The plurality of low-mass electric pumps provide for improved LAE performance by raising the LAE inlet pressure from roughly 240 psia to between 500 to 1000 psia. The higher pressure at plurality of inlets 102 increases the LAE 101 chamber pressure, which increases the specific impulse. The plurality of low-mass electric pumps are actuated by pump controller 112, which modulates the current drive inputs to the pump motors.

Pump controller 112 receives command inputs from OBC 114, based on the pressure measurements at plurality of inlets 102 to LAE 101, as measured by oxidizer line pressure sensor 204 and/or fuel line pressure sensor 205. Although pump inlet pressure is preferably in the range 50 psia to 150 psia, and the plurality of low-mass electric pump preferably supports mass flow rates of up to two pounds of mass per second, pump inlet pressure and mass flow rates may be higher or lower. LAE 101 thrust level is between 400 pounds force to in excess of 600 pounds force, which is higher than the conventional LAE thrust of between 100 pounds force up to 200 pounds force. The higher thrust reduces orbit transfer time and operational costs and, for one desired mission, increases the mass-to-orbit performance by raising the orbit transfer efficiency from 98% to 99%.

Figure 3:
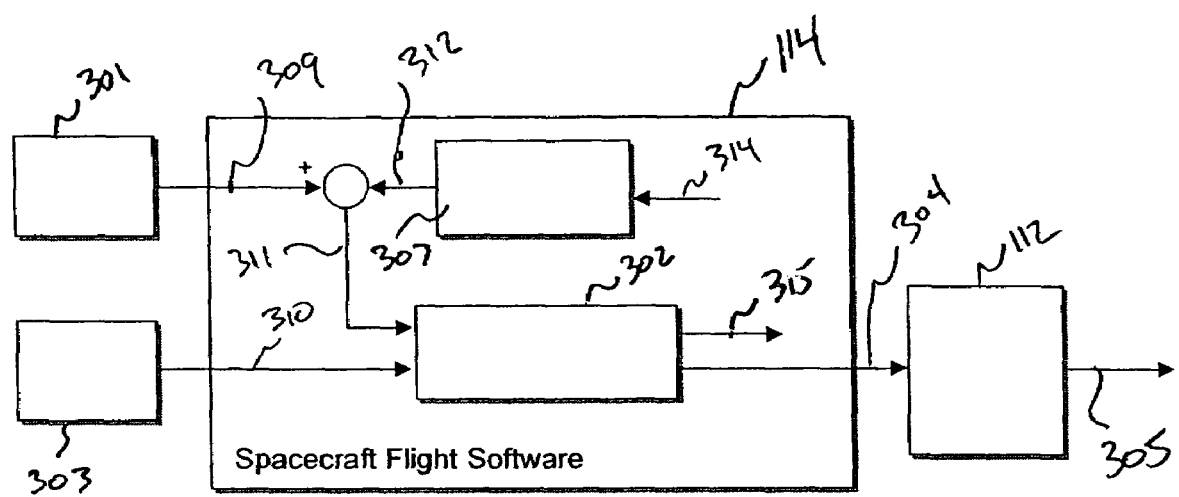
FIG. 3 illustrates one example pump control configuration according to the present invention, including the pump controller software located within the OBC, the pump controller electronics, and the pressure sensors for the propellant lines.

FIG. 3 illustrates one example pump control configuration according to the present invention, including the pump controller software located within OBC 114, pump controller 112, and pressure sensors 301 (such as oxidizer pressure sensor 204 and fuel pressure sensor 205) for the propellant lines.

During an LAE burn, each of the plurality of low-mass electric pumps are active, with their speed controlled to achieve the specified LAE fuel and oxidizer inlet pressures. The speed control software resident in OBC 114 computes pump motor command inputs 304 at pump control logic 302 based on measurements from propellant pressure sensors 301 at the inlets to LAE 101 and measurements from pump speed sensors 303. Command inputs 304 are output to pump controller 112, which generates the current drive inputs 305 that are input to the fuel and oxidizer pump motors.

According to one aspect, pump controller 112 is configured as two separate units, each with 2-for-1 redundant electronics, although according to a second alternative arrangement pump controller 112 is a single unit with 3-for-2 redundant electronics. The pressure profile, received from pressure profile generator 307, is held constant or is varied during maneuvers to modify thrust and mixture ratio. Although FIG. 3 depicts one specific example for a controller, different controller designs may be implemented, such as proportional-integral control or higher-order control schemes, where necessary to maintain accurate LAE inlet pressure control.

Oxidizer and fuel pressure measurements 309 are received from pressure sensors 301 located at plurality of inlets 102 to LAE 101, and pump speed measurements 310 derived from pump speed sensors 303, such as motor Hall sensor outputs, are also received. Oxidizer and fuel pressure errors are computed as the difference between desired pressure profile 312 from pressure profile generator 307 and pressure measurements 309 from pressure sensors 301, and are output as pressure error signal 311. The desired pressure profile is computed at pressure profile generator 307 based on the elapsed maneuver time 314, and provides specified thrust and mixture ration profile. Pressure profile generator 307 includes a number of parameters that are specified by the ground to obtain a specific pressure profile, where different profiles are be used for each maneuver executed during the orbit transfer sequence.

The pressure errors and the pump speeds are input to pump control logic 302, which performs several functions including pump startup prior to the LAE firing, and computation of the pump drive signals during LAE firing. Pump control logic 302 also monitors system performance and issues LAE shutdown commands 315 if oxidizer depletion or a performance anomaly is detected. Oxidizer depletion is detected when the pump speed exceeds a specified threshold, indicating that insufficient oxidizer is available for the pump to operate properly.

Figure 4:
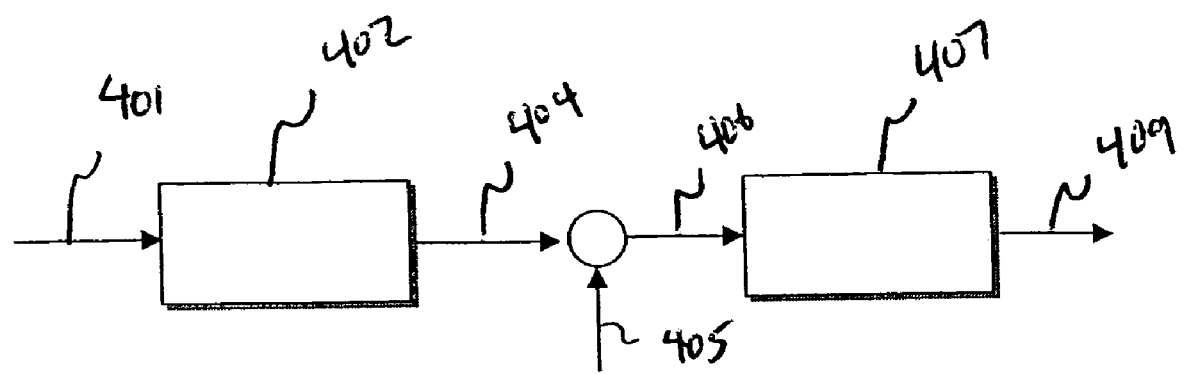
FIG. 4 is a block diagram illustrating the control logic implemented in flight software for controlling the LAE inlet pressure, thrust, and mixture ratio during LAE firing.

FIG. 4 shows a block diagram of processes implemented in the pump control logic to compute pump drive signals. Pressure error 401 is input into compensator 402, which that computes the pump speed demand and outputs pump speed demand signal 404. The pump speed, transmitted via pump speed signal 405, is subtracted from pump speed demand, to compute a pump speed error, where pump speed error signal 406 is input to compensator 407 that computes pump drive signals 409. Compensator 407 compensates for the effect of pump friction to improve tracking performance.

Table 4, below, presents a propellant budget for a reference dual-launch mission using a pump-fed LAE propulsion system according to one embodiment of the present invention, and Table 5 presents a propellant budget for the same mission, but for a spacecraft using a conventional propulsion system. The propellant budgets are generated for a mission where the launch vehicle injects two spacecraft into a 1408 kilometer altitude circular orbit with a 39 degree inclination, and then where each spacecraft executes an orbit transfer to achieve the mission orbit. The mission orbit is circular with a 20,267 kilometer altitude and a 55 degree inclination. The budgets provide the maximum spacecraft dry mass that each mission can support, given the usable Atlas V551 launch vehicle payload system weight for each case (13,624 kilograms with a system according to the invention, and 13,150 kilograms for the conventional system), and assuming a dual-payload adaptor mass of 951 kilograms.

The maximum spacecraft dry mass is 2275 kilograms with an LAE system according to one embodiment of the invention, and 2024 kg using a prior-art system. As shown in Table 3, with these dry masses, the resulting mass margin for the prior-art spacecraft is −225 kilograms, and hence the mission is not viable. For the spacecraft using this system, the mission is viable with a positive 91 kilogram margin. Because the fuel tank is full in both cases (2083 kilograms), the reduced propulsion efficiency using a conventional system limits the usable launch vehicle performance to 87.2% of its capability. Using a system according to the present invention allows 91.1% of the launch vehicle capability to be used.

Furthermore, Tables 6 and 7 provide LAE, pump and motor parameters for two design cases, one which provides an LAE chamber pressure of 500 psia and another which provides an LAE chamber pressure of 700 psia. The total pump power for the 500 psia LAE is 3.86 kW and the pump power for the 700 psia LAE is 5.4 kW. The analysis provided assumes a pump efficiency of 80% and a motor efficiency of 90%. It will be apparent to those with skill in the art that LAEs, pumps, and motors can be configured in accordance with the specified parameters.

Moreover, Table 8 gives estimates of the maximum LAE Isp for an LAE system according to the invention for chamber pressures from 500 psia to 1000 psia, and expansion area ratios (A/A*) from 300 to 400. The theoretical ISP varies from roughly 366 to 370 sec, and given thermal loses expected in a practical design, an ISP of 350 sec is considered realizable with low risk. This ISP is more than 6% higher than the conventional LAE ISP of 329 sec.

According to a second, non-illustrated arrangement, the present invention is a spacecraft including a propulsion system, the propulsion system including an LAE which further includes a plurality of inlets. The propulsion system also includes a plurality of propellant tanks each in fluid communication with the plurality of inlets via a propellant line, and a plurality of low-mass electric pumps. Each of the plurality of low-mass electric pumps is inserted in one of the propellant lines, where the plurality of low-mass electric pumps provide LAE inlet pressure between 500 pounds-force per square inch absolute and 1000 pounds-force per square inch absolute. The spacecraft further includes a solar array, where the solar array is used to re-charge a battery to drive the plurality of low-mass electric pumps, although in an alternate aspect the spacecraft does not include a solar array to re-charge the battery.

The invention has been described with particular illustrative embodiments. It is to be understood that the invention is not limited to the above-described embodiments and that various changes and modifications may be made by those of ordinary skill in the art without departing from the spirit and scope of the invention.

TABLE 4

Enhanced Propulsion System Propellant Budget

| | | |
|---|---|---|
| Reference Mission | Dry Mass + Margin = | 2274.68 kg |
| Enhanced Propulsion System | Pressurant = | 4.30 kg |
| Atlas V 551 | Fuel = | 2083.00 kg |
| 1408 km x 1408 km @ 39.00° | Oxidizer = | 1974.36 kg |
| Launch Date - Jan. 1, 2007 | Separated Mass = | 6336.35 kg |
| Maneuver Life 15.0 years | 2 Spacecraft = | 12673 kg |
| | DPC = | 951 kg |
| | Payload System Weight = | 13624 kg |
| | LV PSW Capability = | 14832 kg |
| | Launch Vehicle Margin = | 8.9% |

TABLE 4-continued

Enhanced Propulsion System Propellant Budget

| Maneuver | ΔV (m/s) | Fuel (kg) | Ox. (kg) | Isp (sec) | Eff. Isp (sec) | Mass (kg) |
|---|---|---|---|---|---|---|
| Separation & Earth Acquisition | — | 0.26 | — | — | — | |
| Low Perigee Pass A/C | — | 0.17 | — | — | — | |
| Attitude Slews | — | 0.98 | — | — | — | 6334.94 |
| Perigee Burns | 1745.05 | 1272.28 | 1272.28 | 350.0 | 346.5 | |
| Apogee Burns | 1539.22 | 687.49 | 687.49 | 350.0 | 346.5 | |
| AC during LAE Burns | 9.88 | 24.67 | — | 210.0 | 209.7 | 2390.73 |
| Transfer Orbit Contingency | — | 20.00 | — | — | — | 2370.73 |
| Nominal Station Acquisition | 3.00 | 3.64 | — | 205.0 | 202.8 | 2367.09 |
| In-Orbit Test (2.5 months) | 0.10 | 0.32 | — | — | — | 2370.41 |
| Station Reposition @ BOL, none | | | | | | |
| Station Repositions | 21.50 | 11.25 | — | 595.0 | 480.8 | |
| Stationkeeping | 7.21 | 12.99 | — | 146.8 | 133.0 | |
| Sk Yaw/Pitch Control | 0.29 | 0.53 | — | 131.0 | 129.6 | |
| Sk Roll Control | — | 0.18 | — | 107.0 | — | |
| Momentum Unloading | — | 9.00 | — | — | — | |
| Total S/K Unaugmented Penalties | — | 0.00 | — | — | — | |
| Retirement | 55.00 | 28.40 | — | 595.0 | 480.8 | 2304.43 |
| Unusable Residuals | — | 10.85 | 11.60 | — | — | |
| Usable Residuals | — | 0.00 | 3.00 | — | — | |
| Totals | | 2083.00 | 1974.36 | | | |

TABLE 5

Conventional Propulsion System Propellant Budgets

| Reference mission | Dry Mass + Margin = | 2024.31 kg |
|---|---|---|
| Prior-Art Propulsion System | Pressurant = | 10.70 kg |
| Atlas V 551 | Fuel = | 2083.00 kg |
| 1408 km × 1408 km @ 39.00° | Oxidizer = | 1981.64 kg |
| Launch Date - Jan. 1, 2007 | Separated Mass = | 6099.65 kg |
| Maneuver Life 15.0 years | 2 Spacecraft = | 12199 kg |
| | DPC = | 951 kg |
| | Payload System Weight = | 13150 kg |
| | LV PSW Capability = | 14832 kg |
| | Launch Vehicle Margin = | 12.8% |

| Maneuver | ΔV (m/s) | Fuel (kg) | Ox. (kg) | Isp (sec) | Eff. Isp (sec) | Mass (kg) |
|---|---|---|---|---|---|---|
| Separation & Earth Acquisition | — | 0.26 | — | — | — | |
| Low Perigee Pass A/C | — | 0.17 | — | — | — | |
| Attitude Slews | — | 0.98 | — | — | — | 6098.24 |
| Perigee Burns | 1745.05 | 1293.30 | 1293.30 | 329.0 | 322.4 | |
| Apogee Burns | 1539.22 | 673.74 | 673.74 | 329.0 | 322.4 | |
| AC during LAE Burns | 9.88 | 23.44 | — | 210.0 | 209.7 | 2140.71 |
| Transfer Orbit Contingency | — | 20.00 | — | — | — | 2120.71 |
| Nominal Station Acquisition | 3.00 | 3.26 | — | 205.0 | 202.8 | 2117.45 |
| In-Orbit Test (2.5 months) | 0.10 | 0.30 | — | — | — | 2120.41 |
| Station Reposition @ BOL, none | | | | | | |
| Station Repositions | 21.50 | 10.06 | — | 595.0 | 480.8 | |
| Stationkeeping | 7.21 | 11.62 | — | 146.8 | 133.0 | |
| Sk Yaw/Pitch Control | 0.29 | 0.48 | — | 131.0 | 129.6 | |
| Sk Roll Control | — | 0.16 | — | 107.0 | — | |
| Momentum Unloading | — | 9.00 | — | — | — | |
| Total S/K Unaugmented Penalties | — | 0.00 | — | — | — | |
| Retirement | 55.00 | 25.39 | — | 595.0 | 480.8 | 2060.45 |
| Unusable Residuals | — | 10.85 | 11.60 | — | — | |
| Usable Residuals | — | 0.00 | 3.00 | — | — | |
| Totals | | 2083.00 | 1981.64 | | | |

TABLE 6

500 PSI Chamber LAE Performance

Parameters

| | | | |
|---|---|---|---|
| Thrust | 500 | lbf | |
| Isp | 350 | lbf * sec/lbm | |
| Area Ratio | 350 | Exit/Throat | |
| Mixture Ratio | 1.00 | (oxid/fuel) | |

Configuration

| | | | |
|---|---|---|---|
| Throat Area | 0.5181 | in^2 | |
| Throat Diameter | 0.8122 | Inches | |
| Exit Area | 181.3 | in^2 | |
| Exit Diameter | 15.19 | Inches | |
| Nozzle Length | 26.8 | Inches | (15 degree conical) |
| Nozzle Length | 20.9 | Inches | (Bell Nozzle) |

Performance

| | | | |
|---|---|---|---|
| Pchamber | 500 | Psia | |
| Pinlet | 833 | Psia | (estimate, oxid cooled) |
| Pinlet | 667 | Psia | (estimate) |
| Propellant Flow | 1.43 | lbm/sec | |
| Oxid Flow | 0.714 | lbm/sec | |
| Fuel Flow | 0.714 | lbm/sec | |

Pump Estimates

| | | | | | | |
|---|---|---|---|---|---|---|
| Oxidizer SG | 1.43 | | | | | |
| Fuel SG | 1.0 | | | 1 ft^3/sec | 448.8 | gpm |
| Head, Oxid | 1346 | Feet | | | | |
| Head, Fuel | 1540 | Feet | | | | |
| Q, Oxid | 3.58 | GPM | | | | |
| Q, Fuel | 5.11 | GPM | | | | |
| Efficiency | 80% | | (estimate) | | | |
| BHP, Oxid | 2.18 | Horsepower | | | | |
| BHP, Fuel | 2.49 | Horsepower | | | | |
| Motor Efficiency | 90% | | (estimate) | | | |
| Power, Oxid | 1.80 | Kilowatts | | | | |
| Power, Fuel | 2.06 | Kilowatts | | | | |
| Total Power | 3.86 | Kilowatts | | | | |

TABLE 7

700 PSI Chamber LAE Performance

Parameters

| | | | |
|---|---|---|---|
| Thrust | 500 | Lbf | |
| Isp | 350 | lbf * sec/lbm | |
| Area Ratio | 350 | Exit/Throat | |
| Mixture Ratio | 1.00 | (oxid/fuel) | |

Configuration

| | | | |
|---|---|---|---|
| Throat Area | 0.372 | in^2 | |
| Throat Diameter | 0.6882 | Inches | |
| Exit Area | 130.2 | in^2 | |
| Exit Diameter | 12.88 | Inches | |
| Nozzle Length | 22.7 | inches | (15 degree conical) |
| Nozzle Length | 17.7 | inches | (Bell Nozzle) |

Performance

| | | | |
|---|---|---|---|
| Pchamber | 700 | psia | |
| Pinlet | 1167 | psia | (estimate, oxid cooled) |
| Pinlet | 933 | psia | (estimate) |
| Propellant Flow | 1.43 | lbm/sec | |
| Oxid Flow | 0.714 | lbm/sec | |
| Fuel Flow | 0.714 | lbm/sec | |

Pump Estimates

| | | | | | | |
|---|---|---|---|---|---|---|
| Oxidizer SG | 1.43 | | | | | |
| Fuel SG | 1.0 | | | 1 ft^3/sec | 448.8 | gpm |
| Head, Oxid | 1885 | feet | | | | |
| Head, Fuel | 2156 | feet | | | | |
| Q, Oxid | 3.58 | GPM | | | | |
| Q, Fuel | 5.11 | GPM | | | | |

TABLE 7-continued

700 PSI Chamber LAE Performance

| | | |
|---|---|---|
| Efficiency | 80% | (estimate) |
| BHP, Oxid | 3.05 | Horsepower |
| BHP, Fuel | 3.48 | Horsepower |
| Motor Efficiency | 90% | (estimate) |
| Power, Oxid | 2.53 | Kilowatts |
| Power, Fuel | 2.88 | Kilowatts |
| Total Power | 5.41 | Kilowatts |

TABLE 8

Specific Impulse For An LAE System According To The Present Invention.

| Pc (psia) | A/A* | CF | ISP (sec) | Astar at 500 lb thrust (in2) |
|---|---|---|---|---|
| 500 | 300 | 1.923 | 366.8 | 0.520020801 |
| 500 | 350 | 1.93 | 368.1 | 0.518134715 |
| 500 | 400 | 1.935 | 369.1 | 0.516795866 |
| 600 | 300 | 1.921 | 366.9 | 0.433801839 |
| 600 | 350 | 1.928 | 368.1 | 0.432226833 |
| 600 | 400 | 1.933 | 369.1 | 0.431108812 |
| 700 | 300 | 1.92 | 366.9 | 0.37202381 |
| 700 | 350 | 1.927 | 368.2 | 0.3706724 |
| 700 | 400 | 1.932 | 369.2 | 0.369713103 |
| 800 | 300 | 1.919 | 366.9 | 0.325690464 |
| 800 | 350 | 1.926 | 368.2 | 0.32450675 |
| 800 | 400 | 1.931 | 369.2 | 0.323666494 |
| 900 | 300 | 1.918 | 366.9 | 0.289653574 |
| 900 | 350 | 1.925 | 368.2 | 0.288600289 |
| 900 | 400 | 1.93 | 369.2 | 0.287852619 |
| 1000 | 300 | 1.917 | 367 | 0.260824204 |
| 1000 | 350 | 1.924 | 368.2 | 0.25987526 |
| 1000 | 400 | 1.929 | 369.3 | 0.259201659 |

What is claimed is:

1. A propulsion system comprising:
a liquid apogee engine further comprising a plurality of inlets;
a plurality of propellant tanks, each in fluid communication with said plurality of inlets via a propellant line;
a plurality of low-mass electric pumps inserted in respective propellant lines, said plurality of low-mass electric pumps providing liquid apogee engine inlet pressure between 500 pounds-force per square inch absolute and 1000 pounds-force per square inch absolute;
a pump controller configured to modulate current drive inputs to said plurality of low-mass electric pumps based upon command inputs; and
an on-board computer configured to calculate the command inputs based upon liquid apogee engine inlet pressure and a pressure profile, and transmit the command inputs to said pump controller,
wherein said on-board computer is further configured to compute the pressure profile based on an executed maneuver and an elapsed maneuver time.

2. The propulsion system according to claim 1, wherein said plurality of propellant tanks includes at least a first fuel tank.

3. The propulsion system according to claim 1, wherein said plurality of propellant tanks includes at least a first oxidizer tank.

4. The propulsion system according to claim 1, wherein said pump controller further comprises two separate controller units, wherein each of said two separate controller units includes 2-for-1 redundant electronics.

5. The propulsion system according to claim 1, wherein said pump controller includes 3-for-2 redundant electronics.

6. The propulsion system according to claim 1, wherein said pump controller implements a proportional-integral controller in order to control the liquid apogee engine inlet pressure.

7. The propulsion system according to claim 1, wherein said pump controller implements a high-order controller in order to control the liquid apogee engine inlet pressure.

8. The propulsion system according to claim 1, wherein said on-board computer implements a proportional-integral controller in order to control the liquid apogee engine inlet pressure.

9. The propulsion system according to claim 1, wherein said on-board computer implements a high-order controller in order to control the liquid apogee engine inlet pressure.

10. The propulsion system according to claim 1, wherein the command inputs are pressure commands.

11. The propulsion system according to claim 1, wherein the propellant lines each include a pressure relief valve, the pressure relief valves allowing for backflow of propellant if a pressure threshold is exceeded.

12. The propulsion system according to claim 1, wherein said plurality of propellant tanks are cylindrical and further comprise spherical end caps.

13. The propulsion system according to claim 1,
wherein said plurality of propellant tanks comprises a first fuel tank, and first and second oxidizer tanks, and
wherein said first fuel tank is disposed between said first and second oxidizer tanks.

14. The propulsion system according to claim 1,
wherein said plurality of propellant tanks comprises a first oxidizer tank, and first and second fuel tanks, and
wherein said first oxidizer tank is disposed between said first and second fuel tanks.

15. The propulsion system according to claim 1, wherein said plurality of low-mass electric pumps enable the liquid apogee engine to provide a specific impulse of at least 350 seconds.

16. The propulsion system according to claim 1, wherein said plurality of low-mass electric pumps support mass flow rates of up to two pounds of mass per second.

17. The propulsion system according to claim 1, wherein a thrust level of said liquid apogee engine is between 400 pounds force and 600 pounds force.

18. The propulsion system according to claim 1, wherein the plurality of low-mass electric pumps have a power range between 3 kW and 6 kW.

19. The propulsion system according to claim 1, further comprising a plurality of thrusters.

20. The propulsion system according to claim 19, wherein said plurality of thrusters are hydrazine reaction engine assemblies.

21. The propulsion system according to claim 19, wherein said plurality of thrusters are arcjets.

22. The propulsion system according to claim 19, wherein said plurality of thrusters operate at an inlet pressure between 50 pounds per square inch absolute and 150 pounds per square inch absolute.

23. The propulsion system according to claim 1, wherein at least one of the plurality of propellant tanks stores dinitrogen tetroxide ($N_2O_4$).

24. The propulsion system according to claim 1, wherein at least one of the plurality of propellant tanks stores hydrazine ($N_2H_4$).

25. A spacecraft, further comprising:
  a propulsion system comprising:
    a liquid apogee engine further comprising a plurality of inlets,
    a plurality of propellant tanks, each in fluid communication with said plurality of inlets via a propellant line,
    a plurality of low-mass electric pumps inserted in respective propellant lines, said plurality of low-mass electric pumps providing liquid apogee engine inlet pressure between 500 pounds-force per square inch absolute and 1000 pounds-force per square inch absolute
    a pump controller configured to modulate current drive inputs to said plurality of low-mass electric pumps based upon command inputs; and
    an on-board computer configured to calculate the command inputs based upon liquid apogee engine inlet pressure and a pressure profile, and transmit the command inputs to said pump controller,
    wherein said on-board computer is further configured to compute the pressure profile based on an executed maneuver and an elapsed maneuver time.

26. The spacecraft according to claim 25, further comprising a solar array, wherein said solar array is used to re-charge a battery to drive said plurality of low-mass electric pumps.

* * * * *